April 22, 1958 M. E. BOURNS ET AL 2,831,670
LINEAR-TYPE ACCELERATION SENSING DEVICE
Filed May 15, 1952 2 Sheets-Sheet 1
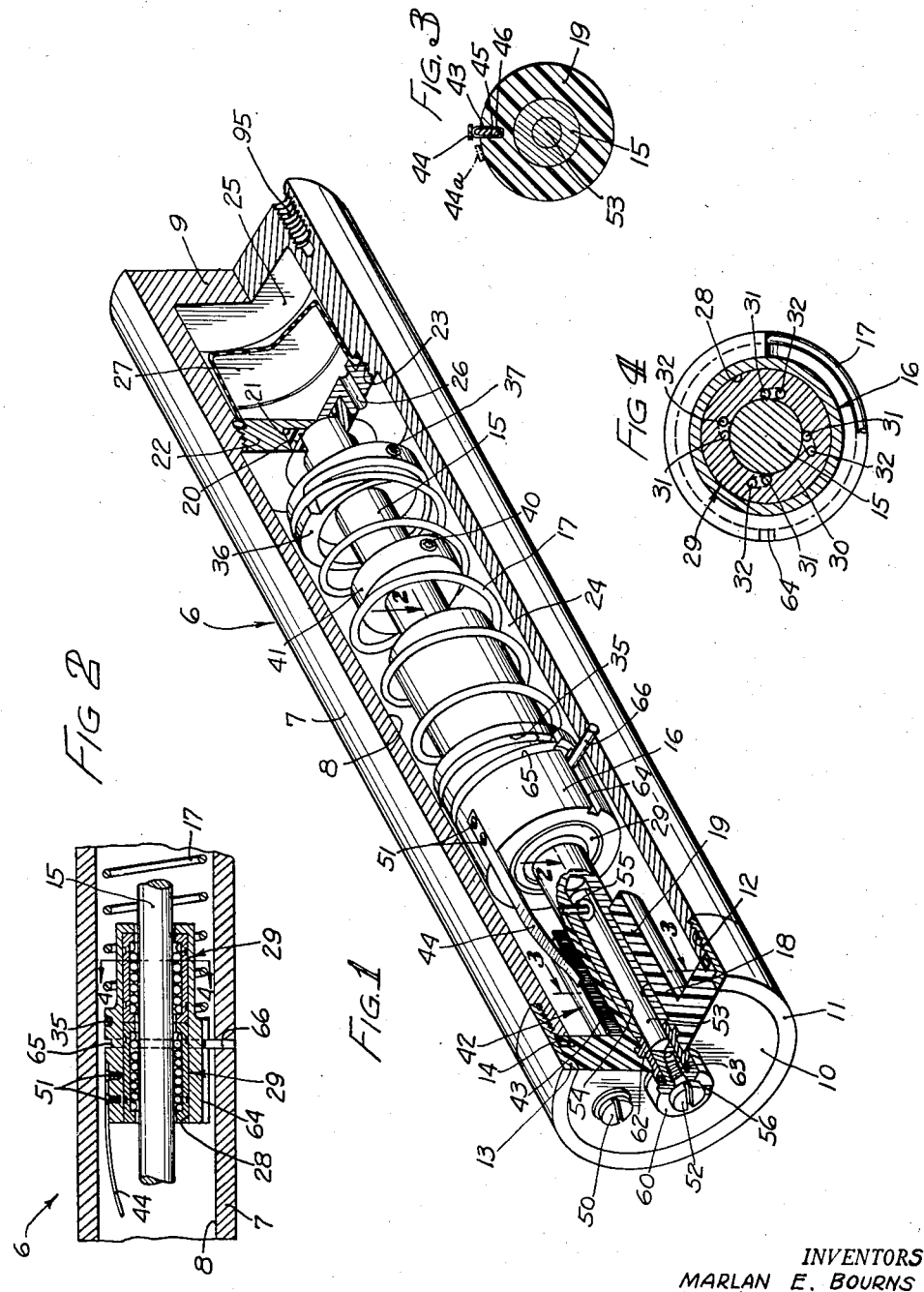
INVENTORS
MARLAN E. BOURNS
MARVIN E. HARRISON
JAMES D. YOUNG
EDWARD J. GOEPPINGER
BY Herbert E. Kidder
AGENT April 22, 1958
M. E. BOURNS ET AL
2,831,670
LINEAR-TYPE ACCELERATION SENSING DEVICE
Filed May 15, 1952
2 Sheets-Sheet 2
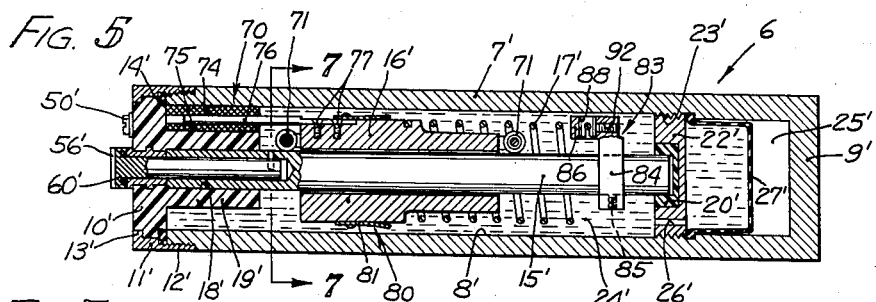
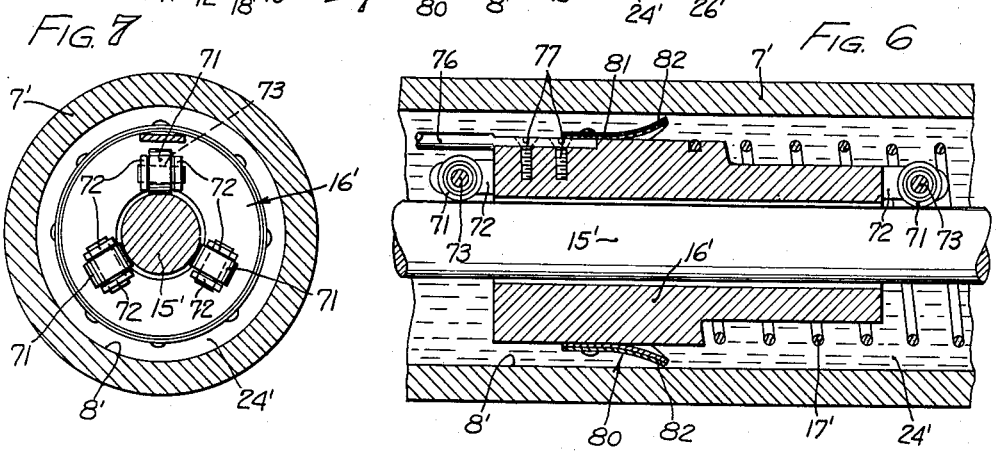
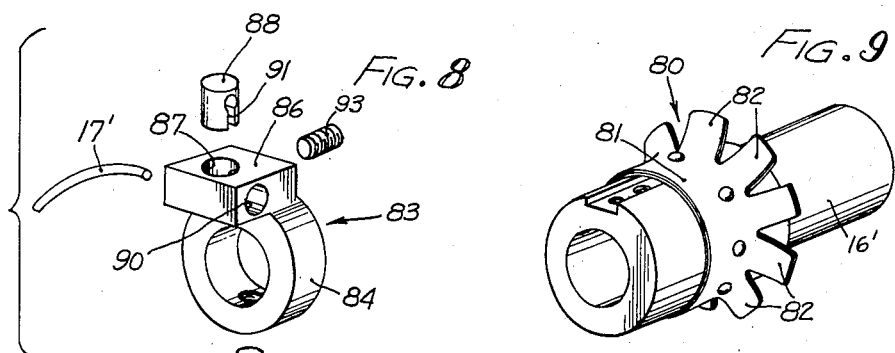
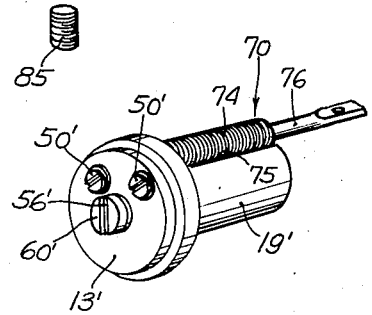
INVENTORS
MARLAN E. BOURNS
MARVIN E. HARRISON
JAMES D. YOUNG
EDWARD J. GOEPPINGER
BY Herbert E. Kidder
AGENT

United States Patent Office 2,831,670
Patented Apr. 22, 1958

2,831,670

LINEAR-TYPE ACCELERATION SENSING DEVICE

Marlan E. Bourns, Marvin E. Harrison, James D. Young, and Edward J. Goeppinger, Riverside, Calif.; said Harrison, said Young, and said Goeppinger assignors to said Bourns Application May 15, 1952, Serial No. 287,968

5 Claims. (Cl. 264—1)

The present invention relates to acceleration sensing devices, and more specifically to a linear type of device particularly designed for installation in airplanes, guided missiles, and the like, to provide electrical signals that can be utilized to operate controls on the vehicle, or that can be relayed by telemetering equipment to recording instruments on the ground to record accelerations experienced by the aircraft or missile. For work of this type, it is essential that the instrument be extremely compact and exceedingly accurate under the extreme conditions encountered in aircraft and missile applications, and at the same time, rugged enough to withstand the severe stresses imposed on the equipment.

Another object of the invention is to provide an instrument that will measure accelerations in both senses of one direction with a high degree of accuracy and sensitivity, but will not respond appreciably to accelerations in directions other than the ones desired.

Another object is to provide an acceleration sensing device in which the spring-mass system is damped, so that the electrical signal is representative of the accelerations being measured, and does not tend to lag or overshoot. In this connection, damping is provided by a fluid medium, and in order to prevent the development of excessive pressure within the case as a result of expansion of the damping fluid with changes in temperature, an internal air chamber is provided which is compressible to accommodate such expansion.

Another object of the invention is to provide means whereby the moving parts of the instrument may be locked against movement relative to the outer case when the unit is not in actual use, so as to protect the delicate mechanism from excessive wear or damage.

Still another object is to provide an instrument of simplified design which is well adapted to mass production techniques, and in which the operating mechanism may be assembled, adjusted, and calibrated outside of the case to facilitate production and calibration of the instrument.

The foregoing objects are achieved in the present invention by providing a body having a chamber, within which is disposed a sliding mass member supported on anti-friction bearings for movement along a straight line. A helical spring is attached to the body and to the mass member to exert a yielding restraint on the latter against movement in either direction. A variable output impedance element is operatively connected between the body and the mass member so as to produce an electrical signal responsive to movement of said mass member from a given reference point against the thrust of the spring. The electrical signal may be in the form of a variation in voltage or current flow, which can be utilized in a suitable circuit for control purposes or in telemetering equipment. In the preferred embodiment of our invention, this impedance element takes the form of a variable resistance circuit which may be connected electrically as a potentiometer circuit. The invention is not limited to a resistance-type unit, however, but includes also both inductance and capacitance units.

Other objects and advantages of the present invention will become apparent to those skilled in the art upon consideration of the following detailed description of the preferred embodiment thereof, reference being had to the accompanying drawings, wherein;

Figure 1 is a partially sectioned perspective view of an acceleration sensing device embodying the principles of our invention;

Figure 2 is a fragmentary median sectional view through the same, taken at 2—2 in Figure 1;

Figure 3 is a section at 3—3 in Figure 1;

Figure 4 is a transverse section through the movable mass member, taken at 4—4 in Figure 2;

Figure 5 is a median sectional view through another embodiment of the invention;

Figure 6 is an enlarged fragmentary sectional view through the same, showing the bi-metal thermostat vanes on the mass member in extended position to increase the damping effect of the fluid at elevated temperatures;

Figure 7 is an enlarged transverse section through the unit, taken at 7—7 in Figure 5, showing the disposition of anti-friction rollers supporting the movable mass;

Figure 8 is an exploded view of the locking member for securing the end of the spring to the shaft on which the mass member slides;

Figure 9 is a perspective view of the mass member illustrated in Figures 5 and 6; and Figure 10 is a perspective view of the lid closing the end of the cylindrical body in Figure 5, showing an inductance coil mounted thereon.

The first form of the invention to be described is that illustrated in Figures 1 to 4 inclusive, to which reference will now be had. The acceleration sensing device is seen to comprise a body 6 which, in the preferred form, consists of a metal tubular casing 7 having a cylindrical bore 8 provided therein. The bore 8 is closed at one end by an end wall 9, and at the other end by a nonconductive lid 10, preferably of plastic, which is held in place by a sleeve 11. Sleeve 11 is screwed onto a threaded portion 12 of the casing 7 and is provided with an inwardly projecting radial flange 13 that engages the outer edge of the lid. An O-ring 14 seals the junction of the casing with the lid. Mounted within the casing on the longitudinal axis thereof is a shaft 15, and slidably supported thereon is a mass member 16, which is yieldingly restrained against movement in either direction along the shaft by a helical spring 17.

The left-hand end of the shaft 15, as viewed in Figure 1, is inserted into a bore 18 in a hub 19 of the lid, and is freely rotatable therein. The right-hand end of the shaft is also rotatably held by a rubber or plastic bushing 20, which is seated in a counterbore 21 in the center of a disk 22. The disk 22 is threaded on its periphery and is screwed into threads 23 on the inside surface of the casing 7, forming a partition dividing the interior of the casing into a main chamber 24 and an expansion chamber 25. The main chamber 24 is filled with a fluid damping medium, such as silicone oil, which has a restraining action on movement of the mass member 16 along the length of the shaft 15.

The expansion chamber 25 communicates with the main chamber 24 through a vent 26 in the disk, and on the right-hand side of the disk the fluid is contained by means of a cup-shaped diaphragm 27 of rubber or other elastomer, having a bead around its edge that is tightly clamped between opposed shoulders on the disk 22 and casing 7. The portion of the chamber to the right of the diaphragm 27 is filled with air, and the elastic diaphragm stretches or contracts to accommodate any volumetric change of the damping fluid resulting from temperature changes.

The mass member 16 is preferably formed as a cylindrical block of solid brass or other electrically conductive metal, and is bored out at 28 to receive two linear-type ball bearings 29, mounted end to end. Each of the bearings 29 comprises a steel sleeve 30 having on its inner surface a plurality of circumferentially spaced, longitudinally extending race ways filled with balls. Each of said race ways comprises an inner course 31 (see Figure 4) wherein said balls ride on shaft 15, and an outer course 32 connected to the ends of said inner course to return said balls from one end thereof to the other. Linear-type ball bearings of this type form a substantially frictionless support for the mass member 16, and the longitudinally spaced bearings provide two widely spaced areas of support on the shaft to stabilize the mass and prevent it from becoming cocked and binding on the shaft.

One end of the spring 17 is received within and soldered to a spiral groove 35 in the outside surface of the mass 16, while the other end of the spring is similarly attached to a fitting 36 which is secured on the shaft 15 by a set screw 37. Also secured on the shaft 15 by a set screw 40 is a limit stop ring 41, which limits the travel of the mass 16 to the right, as viewed in Figure 1.

Sliding motion of the mass 16 along the shaft 15, responsive to acceleration of the unit along a line parallel to the axis of the shaft, is translated into an electrical signal by means of a variable impedance element 42, by which term we include variable resistance, inductance, or capacitance, or any combination of two or more. In the preferred form illustrated in Figure 1, the variable impedance element 42 takes the form of a potentiometer, comprising a resistance coil 43 and a sliding contact or wiper 44. The coil 43 is flattened on the sides, as shown in Figure 3, and is wrapped around a core 45; the assembly being seated within a radial slot 46 in the hub 19 of the lid 10. The lid 10 is preferably moulded of thermo setting plastic, such as phenol formaldehyde, although other materials may be used. The ends of the coil 43 are connected to two terminals 50 on the lid 10, only one of which can be seen in Figure 1. The sliding contact 44 is in the form of a leaf spring, which is secured at one end by screws 51 to the mass member 16. The signal picked up by the contact 44 from coil 43 is transmitted to the mass member 16, and thence through spring 17 to fitting 36. From fitting 36, the signal is carried along shaft 15 to a terminal screw 52 in the center of lid 10. Screw 52 is threaded into a tapped hole in the end of a shaft 53, which extends into a central bore 54 in the end of shaft 15. Shaft 53 is non-rotatably secured to shaft 15 by means of a pin 55, and by virtue of this arrangement, shaft 15 can be turned by means of a screw driver inserted into a slot 56 in the head 60 of shaft 53. Shaft 15, as mentioned earlier, is rotatably supported at its left-hand end (Figure 1) within the bore 18 in lid 10, while the projecting end of shaft 53 extends through a bushing 62 in the lid. An O-ring 63 provides a seal between the head 60 and end of bushing 62, to prevent leakage of the damping fluid.

In order to protect the potentiometer 42 and mass 16 from damage when the unit is not in use, means is provided whereby the mass can be rotated slightly to shift the wiper 44 from its normal position on top of the coil 43 over to an inoperative position shown in phantom lines at 44a in Figure 3, and at the same time lock the mass 16 against sliding movement along the shaft 15. To this end, the mass 16 is provided with grooves 64 and 65, the former extending parallel to the axis of shaft 15, and the latter extending circumferentially around the mass member 16. A dowel pin 66 is driven through a hole in the side of casing 7 and projects into the grooves 64, 65, as shown in Figures 1 and 2.

When the wiper 44 is on top of coil 43, the dowel pin 66 is seated within the longitudinally extending groove 64 and serves as a guide, permitting longitudinal movement of the mass member 16 while at the same time preventing rotational movement of the same about the shaft. Normally, when the mass member 16 is at rest, the dowel pin 66 will be positioned at the intersection of the grooves 64, 65, and when the shaft 15 is rotated by means of a screw driver inserted in the slot 56, the mass 16 is caused to turn with the shaft by the spring 17. This rotation of the mass 16 causes the longitudinal grooves 64 to move around to a position out of alignment with pin 66, while at the same time, wiper 44 is moved around to the position indicated at 44a in Figure 3. In this condition, the mass 16 is held against movement with respect to the body 6, and the mechanism is effectively locked to protect it from damage or undue wear.

As mentioned earlier, the invention is not limited to a resistance-type unit, such as the potentiometer 42, but may also embody any equivalent device, such as a variable inductor or capacitor. Figures 5–10 show another embodiment of the invention wherein the signal is produced by an inductor 70, which may be of either the self or mutual inductance type. Elements of this embodiment which are similar in function and structure to the previously described embodiment are given the same reference numerals with a prime (') suffix.

Another structural difference that will be evident in Figures 5, 6, and 7 is the bearing arrangement supporting the sliding mass member 16' on the shaft 15'. In this instance, the bearing support is provided by two sets of anti-friction rollers 71, disposed at opposite ends of the mass. Each group consists of a plurality, preferably three in number, of rollers spaced equidistantly around the shaft 15' as shown in Figure 7. Each roller 71 is disposed between a pair of laterally spaced lugs 72 projecting axially from the end of the mass member 16', and is rotatably supported on a shaft 73 which is held at its ends by the said lugs. The rollers 71 may, for convenience, be in the form of ball bearings, the outer race of which forms the roller riding on the shaft 15'. Under certain circumstances, it may not be necessary to use anti-friction rollers, and in this case the rollers 71 would be provided with plain sleeve bearings, which would be journaled on the shaft 73. The widely spaced sets of rollers at opposite ends of the mass 16' maintain alignment of the latter on the shaft 15', and provide substantially frictionless support for the mass.

The inductor 70 comprises a coil 74 seated within a slot 75 in the hub portion 19' of lid 10'. The ends of the coil are connected to terminals 50'. The inductance of the coil 74 is varied by means of an iron core 76 in the form of a rod attached by screws 77 to the mass member 16' and projecting axially from the left-hand thereof. The core extends into the hollow center of coil 74, causing the inductance of the coil to vary as a function of the distance to which the core extends into the coil. An alternating current is applied to the terminals 50', and the amount of current passing through the coil 74 is governed by the inductance, which depends, in turn, on the distance to which the core 76 projects into the coil. The electrical signal, in this case, is represented by the fluctuation of current from some predetermined reference level.

The inductor 70 could also take the form of a mutual inductance (not shown) in which there would be a primary and secondary coil. In this case, alternating current would be fed into the primary coil, and an induced current taken from the secondary coil, as is well understood in the art. The amount of current induced in the secondary coil would depend upon the magnetic linkage between the two coils, and this could be controlled by shifting the position of the secondary coil with respect to the primary, or by shifting a magnetic core relative to fixed primary and secondary coils. Other obvious variations will occur to those skilled in the art.

Movement of the mass member 16' within the chamber 24' is damped by means of a fluid medium, and in certain installations wherein the instrument is exposed to extremes of temperature variation, the damping fluid may undergo a considerable change in viscosity, which affects the damping rate. In order to maintain a substantially uniform damping rate under conditions of varying viscosity, we provide thermostatically controlled means for varying the resistance to movement of the mass 16' within its fluid medium in inverse proportion to the viscosity of the fluid. The thermostatically controlled means is designated in its entirety by the reference numeral 80, and comprises a bi-metallic sleeve 81 riveted to the mass member 16' and having a plurality of vanes 82 projecting from one end thereof. The unit 80 is arranged so that at elevated temperatures when the viscosity of the fluid medium is low, the vanes 82 project radially outward, as in Figures 6 and 9, blocking the space between the mass member 16' and inner surface of the chamber 24', and providing considerably increased resistance to movement of the fluid from one side of the vanes to the other. This increased resistance has the effect of increasing the damping effect, thereby compensating for the reduced viscosity of the fluid medium at high temperatures.

When the fluid becomes cold and its viscosity increases, the bi-metal vanes 82 draw in flat against the side of the mass member 16', as in Figure 5. In this condition, the unit 80 provides the minimum resistance to flow of the fluid past the member 16', thereby reducing the damping effect to compensate for increased viscosity of the fluid.

In Figures 5 and 8 is illustrated a modified form of fitting 83 for adjustably securing the end of spring 17' to shaft 15'. The fitting 83 comprises a ring 84 which encircles the shaft 15' and is secured thereto by a set screw 85. A block 86 is mounted on the top side of ring 84, and a vertical hole 87 is formed therein to receive a plug 88. Intersecting the hole 87 and extending all the way through the block 86 is another hole 90, through which the end of the spring 17' extends. The plug 88 is slotted diametrically at 91 from its bottom end, and the inner end of the slot is enlarged slightly to receive the end of spring 17'. A tapped hole 92 (see Figure 5) intersects the hole 87 at right angles to the latter, and a set screw 93 is screwed into the tapped hole, bearing against one side of the slotted plug 88 and clamping the latter tightly around the spring 17'. The locking device which is described has the advantage of being adjustable both along the shaft 15' and along the spring 17', providing a positive anchorage for the spring without distorting the latter or imposing any strains therein which would affect the springing rate of the same. Plug 88 is rotatable within the hole 87 when set screw 93 is backed out, which permits it to take the angle of the spring 17', without bending the latter. Hole 90 should also be large enough to accommodate various pitch angles of the spring 17', and also to accommodate the helical curvature of the spring.

In both the embodiments shown, the instrument is mounted in the missile, aircraft, or other device being tested, by means of screws (not shown) which are threaded into tapped holes 95 in the base of the unit. The body is mounted with its longitudinal axis parallel to the direction of acceleration being measured, and the mass member 16 is unlocked and placed in operative position, as shown in Figure 1. When the unit is subjected to accelerations in the direction of the axis of shaft 15, inertia of the mass member 16 causes the latter to slide along the shaft 15 against the resistance of spring 17. This shift in position in the mass member produces a corresponding shift in the relative position of the stationary and movable parts of the potentiometer 42 or equivalent unit, causing an electrical signal to be produced that can be used for control or telemetering purposes.

While we have shown and described in considerable detail what we believe to be the preferred form of our invention, it will be understood that various changes may be made in the shape and arrangement of the several parts without departing from the broad scope of the invention, as defined in the pending claims.

We claim:

1. An acceleration sensing device comprising a generally tubular body, a support member disposed within said body and extending lengthwise thereof, a mass member mounted on said support member for movement along the length thereof, said mass member being provided with two longitudinally spaced sets of anti-friction bearings that ride on said support member, a spring attached to said mass member for yieldingly holding the same against movement along said support member, an end cap closing one end of said body, said support member being attached at one end to said end cap, a resistance element mounted on said end cap within said body parallel to said support member, a contact finger attached to said mass member and projecting axially from the end thereof adjacent said end cap, said contact finger wiping on said resistance element, and terminal means on said end cap electrically connected to said resistance element and to said contact finger.

2. An acceleration sensing device comprising a body member, a mass member supported on said body member for movement relative thereto along a straight line, a spring yieldingly holding said mass member against movement relative to said body, a variable impedance element connected to said body and to said mass, whereby sliding movement of the latter relative to said body produces an electrical signal, a projection on one of said members slidably disposed within a groove in the other member, said groove including a straight portion parallel to the line of travel of said mass member and a crosswise portion at right angles to said line of travel, and means projecting through said body member whereby said mass member can be turned to position said projection in said crosswise portion of said groove to lock said mass member against movement along said straight line.

3. An acceleration sensing device including a hollow body, a mass supported within said body for sliding and rotational movement relative thereto, said mass having a groove formed in its outer surface including a straight portion parallel to the line of sliding travel thereof and a crosswise portion at right angles to said line of sliding travel, a pin fixed to said body and projecting into said groove, and a member attached to said mass and projecting through said body, said member being rotatable to position said mass so that said pin is located in said straight portion of said groove to permit sliding movement of said mass, or in said crosswise portion of said groove to lock said mass against sliding movement.

4. An acceleration sensing device comprising a hollow body, a shaft supported on said body in the interior thereof, a mass mounted on said shaft for sliding and rotational movement relative thereto, a spring attached at one end to said mass and at the other end to said shaft for yieldingly holding said mass against movement along the shaft, a variable impedance element associated with said body and said mass, whereby sliding movement of the latter relative to said body produces an electrical signal, said mass having a groove formed in its outer surface including a straight portion parallel to the line of sliding travel thereof and a crosswise portion at right angles to said line of sliding travel, a pin fixed to said body and projecting into said groove, and means forming an extension of said shaft through one end of said body whereby the shaft can be rotated to position said mass so that said pin is located in said straight portion of said groove to permit sliding movement of the mass, or in said crosswise portion of the groove to lock said mass against sliding movement.

5. In an acceleration sensing device, a body having a hermetically sealed, elongated chamber formed therein, a mass member disposed within said chamber and movable longitudinally therein, spring means engaging said mass member to exert a yielding restraint thereon opposing movement of said mass member relative to said body, a fluid damping medium filling said chamber and acting to restrain the movement of said mass, and compressible means within said chamber to accommodate expansion of said fluid medium due to temperature change, said compressible means consisting of a second chamber communicating with said first named chamber, and an elastic diaphragm dividing said second chamber into a fluid-filled end and an air-filled end, said diaphragm being stretchable into said air-filled end as said fluid expands so as to accommodate such expansion.

References Cited in the file of this patent

UNITED STATES PATENTS

| | | |
|---|---|---|
| 1,451,923 | Pierce | Apr. 17, 1923 |
| 1,519,473 | Zahm | Dec. 16, 1924 |
| 1,624,219 | Cowdrey | Apr. 12, 1927 |
| 1,754,055 | Senter | Apr. 8, 1930 |
| 2,332,994 | Draper | Oct. 26, 1943 |
| 2,338,761 | Draper | Jan. 11, 1944 |
| 2,371,040 | Fisher | Mar. 6, 1945 |
| 2,427,239 | Taylor | Sept. 9, 1947 |
| 2,440,605 | Hathaway | Apr. 27, 1948 |
| 2,484,165 | Hathaway | Oct. 19, 1949 |
| 2,552,722 | King | May 15, 1951 |
| 2,570,672 | Hathaway | Oct. 9, 1951 |
| 2,591,921 | Cosgriff | Apr. 8, 1952 |
| 2,640,900 | Klose | June 2, 1953 |

FOREIGN PATENTS

| | | |
|---|---|---|
| 46,402 | Austria | Feb. 10, 1911 |
| 672,042 | France | Sept. 14, 1929 |